United States Patent
Hayashida et al.

(10) Patent No.: US 7,632,874 B2
(45) Date of Patent: *Dec. 15, 2009

(54) HARDCOAT AGENT COMPOSITION AND OPTICAL INFORMATION MEDIUM THEREOF

(75) Inventors: Naoki Hayashida, Tokyo (JP); Rie Ihara, Tokyo (JP); Hidetake Itoh, Tokyo (JP); Kazushi Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 178 days.

This patent is subject to a terminal disclaimer.

(21) Appl. No.: 10/576,195

(22) PCT Filed: Oct. 21, 2004

(86) PCT No.: PCT/JP2004/015953

§ 371 (c)(1), (2), (4) Date: Apr. 17, 2006

(87) PCT Pub. No.: WO2005/049687

PCT Pub. Date: Jun. 2, 2005

(65) Prior Publication Data

US 2007/0148596 A1    Jun. 28, 2007

(30) Foreign Application Priority Data

Oct. 21, 2003   (JP)   ............... 2003-360123

(51) Int. Cl.
| | |
|---|---|
| *C08K 3/22* | (2006.01) |
| *C08K 3/30* | (2006.01) |
| *C08K 3/36* | (2006.01) |
| *C09D 175/16* | (2006.01) |
| *C08K 9/06* | (2006.01) |
| *C08G 18/50* | (2006.01) |
| *C08G 18/67* | (2006.01) |
| *C08G 18/81* | (2006.01) |
| *B32B 3/02* | (2006.01) |

(52) U.S. Cl. .............. 522/82; 522/83; 522/96; 522/97; 524/430; 524/431; 524/432; 524/433; 524/420; 524/493; 523/205; 523/209; 428/64.4

(58) Field of Classification Search ............ 522/83, 522/96, 97, 82; 523/205, 209; 524/430, 524/431, 432, 433, 420, 493

See application file for complete search history.

(56) References Cited

U.S. PATENT DOCUMENTS

| | | | |
|---|---|---|---|
| 4,440,918 A | 4/1984 | Rice et al. | |
| 4,508,916 A * | 4/1985 | Newell et al. | 556/420 |
| 5,426,131 A * | 6/1995 | Katsamberis | 522/16 |
| 5,846,650 A * | 12/1998 | Ko et al. | 428/336 |
| 6,013,749 A * | 1/2000 | Baba et al. | 526/279 |
| 6,087,413 A * | 7/2000 | Lake | 522/75 |
| 6,160,067 A | 12/2000 | Eriyama et al. | |
| 6,238,798 B1 * | 5/2001 | Kang et al. | 428/421 |
| 6,332,291 B1 * | 12/2001 | Flosbach et al. | 522/91 |
| 6,376,572 B1 * | 4/2002 | Turri | 522/173 |
| 7,074,472 B2 | 7/2006 | Itoh et al. | |
| 7,084,187 B2 * | 8/2006 | Takase et al. | 522/153 |
| 7,173,778 B2 * | 2/2007 | Jing et al. | 359/810 |
| 7,196,136 B2 * | 3/2007 | Soutar et al. | 524/858 |
| 7,264,872 B2 * | 9/2007 | Walker et al. | 428/328 |
| 7,491,441 B2 * | 2/2009 | Pokorny et al. | 428/328 |
| 2004/0181008 A1 | 9/2004 | Hanazawa et al. | |

FOREIGN PATENT DOCUMENTS

| | | |
|---|---|---|
| DE | 30 13 827 C2 | 1/1993 |
| EP | 0 379 462 | 7/1990 |
| EP | 1 057 849 | 12/2000 |
| EP | 0 807 136 B1 | 6/2003 |
| EP | 1 520 688 A1 | 4/2005 |
| JP | 10-110118 | 4/1998 |
| JP | 11-503768 | 3/1999 |
| JP | 11-213444 | 8/1999 |
| JP | 11-293159 | 10/1999 |
| JP | 2002-190136 | 7/2002 |
| JP | 2005-519146 | 6/2005 |
| WO | 01/00701 | 1/2001 |
| WO | 03/002628 | 1/2003 |
| WO | WO 03/072625 A1 | 9/2003 |

* cited by examiner

*Primary Examiner*—Susan W Berman
(74) *Attorney, Agent, or Firm*—Oblon, Spivak, McClelland, Maier & Neustadt, L.L.P.

(57) ABSTRACT

A hardcoat agent composition comprising a fluorine-containing polyether compound (A) having a perfluoropolyether unit, urethane bond and active energy ray reactive group and a curable compound (B) having equal to or more than 2 active energy ray polymerizing groups in the molecule. An optical information medium having a film substance composed of single or multiple layers containing at least the recording layer 4 or the reflecting layer on the supporting substrate 20, the optical information medium wherein at least either the surface of the supporting substrate 20 or that of the above-mentioned film substance is formed by the hardcoat layer 8 containing a curable substance of the above-mentioned hardcoat agent composition.

8 Claims, 2 Drawing Sheets

LASER BEAM

HARDCOAT AGENT COMPOSITION AND OPTICAL INFORMATION MEDIUM THEREOF

TECHNICAL FIELD

This invention relates to a hardcoat agent composition effective in forming on the surface of various substances a hardcoat layer excellent in antifouling property and lubricating property as well as in scratch resistance and wear resistance.

In addition, the invention relates to a substance having on the surface a hardcoat layer formed by using the above-mentioned hardcoat agent composition. Substances to which impartation of a hardcoat layer is required on the surface include an optical information medium, optical lens, optical filter, anti-reflection film and various display elements such as a liquid crystal display, CRT display, plasma display and EL display.

The invention particularly relates to optical information media such as a playback-only optical disk, optical recording disk or magneto optical recording disk having on the surface a hardcoat layer formed by using the above-mentioned hardcoat agent composition. More particularly, the invention relates to optical information media excellent in antifouling property and lubricating property as well as in scratch resistance and wear resistance on the surface of a record and/or playback beam entering side.

BACKGROUND ART

Stains derived from various staining substances and finger prints will attach on optical disks such as a playback-only optical disk, optical recording disk and a magneto optical recording disk, when they are used. Such attachment of stains or finger prints is undesirable and optical disks may be given an appropriate surface treatment to the surface for improving antifouling property, reducing finger-print attachment property or increasing finger-print removing property. For example, giving various water/oil repellent treatments to the surface of optical disks is being examined.

For the purpose of improving the scratch resistance of the surface of an optical information medium, it is general practice to form a transparent and scratch-resistant hardcoat on the surface of the record and/or playback beam entering side in the medium. The hardcoat is formed by coating on the surface of a medium an active energy ray polymerizing curable compound having 2 or greater polymerizing functional groups such as (meth)acryloyl in the molecule, which is allowed to cure by irradiation of an active energy ray such as an ultraviolet ray. However, such a hardcoat is given only for improving the scratch resistance and therefore not expected to have an antifouling effect on dust, atmospheric oil mist or staining substances such as finger print stains.

The hardcoat having an antifouling property against organic stains is proposed Japanese Publication JP-A-10-110118 which proposed that non cross-linking fluorochemical surfactants are kneaded into hardcoat agents. Non cross-linking fluorochemical surfactants do not have a polymerizing double bond or will not cross-link base resin used in hardcoat agents.

Japanese Publication JP-A-11-293159 also proposes that both non cross-linking fluorochemical surfactants and cross-linking fluorochemical surfactants are kneaded into hardcoat agents. Cross-linking fluorochemical surfactants include fluorinated alkyl(meth)acrylates such as perfluorooctylethyl meth)acrylate, hexafluoropropyl(meth)acrylate and octafluoropentyl(meth)acrylate. These cross-linking fluorochemical surfactants are of a polymerizing double bond and fixed by cross-linkage with a base resin of hardcoat agents.

Japanese Publication JP-A-11-213444 has disclosed that fluorinated polymers are coated on the surface of optical disk base plates such as conventional polycarbonates Japanese Publication JP-A-11-503768 has disclosed a radiation curable composition consisting of a fluorinated urethane oligomer and diluent monomer.

Japanese Publication JP-A-2002-190136 has disclosed that metal chalcogenide microparticles such as silica microparticles are allowed to be contained in a hardcoat to increase the scratch resistance of the hardcoat and also the film of a silane coupling agent containing a water-repellent group or oil-repellent group is provided on the hardcoat to impart an increased antifouling property to the surface of an optical information medium.

When the friction coefficient of the optical information medium is reduced, since it is possible to slide and avoid impact that occurs with contact with a hard projected substance, the development of scratches can be controlled. Therefore, it is desirable to reduce the friction coefficient on the hardcoat surface to improve the scratch resistance. In particular, Blu-ray Disc is now commercially available in which the numerical apertures (NA) of objective lens for focusing record/playback laser light is increased to approximately 0.85 and the entering wave of record/playback laser light is decreased to approximately 400 nm to make a diameter of light focusing spot of laser light smaller, thereby attaining a recording capacity more than 4 times greater than that of DVD. As described above, an increased NA makes smaller the working distance between the objective lens and the surface of an optical information medium, (for example, in the case of NA=approximately 0.85, the working distance is approximately 100 μm, which is extremely narrow as compared with the conventional case), thus making it extremely likely that the surface of the optical information medium may contact with the objective lens or a supporting substrate of the lens, while the optical information medium is rotating. Therefore, it is necessary to increase the wear resistance on the hardcoat surface and also reduce the friction coefficient.

Further, regarding factors other than the optical disk, the scratch resistance and wear resistance must be imparted to various display elements such as an optical lens, optical filter, anti-reflection film, liquid crystal display, CRT display, plasma display and EL display. In most cases, a protective layer (hardcoat layer) is imparted to their surfaces. As with an optical disk, stains derived from various staining substances and finger prints will attach to the surface of these substances, while they are used. Attachment of these stains and finger prints is not desired, which necessitates development of a hardcoat layer excellent in antifouling property.

However, the above-described conventional technology has physical problems that the hardcoat is insufficient in antifouling property and lower in hardness, in addition to a higher production cost.

DISCLOSURE OF INVENTION

Accordingly, an objective of the invention is to provide a hardcoat agent composition effective in forming a hardcoat layer excellent in antifouling property and lubricating property as well as scratch resistance and wear resistance on the surface of various substances.

Another objective of the invention is to provide a substance having on the surface the hardcoat layer formed by using the above-mentioned hardcoat agent composition.

In particular, an objective of the invention is to provide an optical information medium having the surface of a record and/or playback beam entering side which is excellent in antifouling property and lubricating property as well as in scratch resistance and wear resistance.

After painstaking efforts, the inventors have found that such a hardcoat agent composition can be obtained that is able to form a hardcoat layer excellent in antifouling property and lubricating property, with hardness maintained, by using fluorine-containing polyether compounds having an active energy ray reactive group and urethane bond.

The invention includes the following:

(1) A hardcoat agent composition comprising a fluorine-containing polyether compound (A) having a perfluoropolyether unit, urethane bond and active energy ray reactive group and a curable compound (B) having equal to or more than 2 active energy ray polymerizing groups in the molecule.

(2) The hardcoat agent composition described in the above (1) wherein the fluorine-containing polyether compound (A) is contained in a range from 0.01 parts by weight or greater to 3 parts by weight or less in relation to 100 parts by weight of nonvolatile parts in the composition.

The nonvolatile parts include optional compositions such as inorganic microparticles (C), photopolymerization initiators and various additive agents to be described later, in addition to the fluorine-containing polyether compound (A) and the curable compound (B).

(3) The hardcoat agent composition described in the above (1) or (2) wherein the curable compound (B) contains 65 to 100% by weight of curable compound (Bt) having 3 or more active energy ray polymerizing groups in the molecule and 0 to 35% by weight of the curable compound (Bd) having 2 active energy ray polymerizing groups in the molecule on the basis of the curable compound (B).

(4) The hardcoat agent composition described in any one of the above (1) to (3) wherein the fluorine-containing polyether compound (A) has the number average molecular weight ranging from 500 or greater to 10,000 or less on the basis of polystyrene standard determined by GPC (Gel Permeation Chromatography).

(5) The hardcoat agent composition described in any one of the above (1) to (4) wherein the fluorine-containing polyether compound (A) has 2 or more active energy ray reactive groups in the molecule.

(6) The hardcoat agent composition described in any one of the above (1) to (5) wherein active energy ray reactive groups contained in the fluorine-containing polyether compound (A) are selected from groups comprising the (meth)acryloyl group and vinyl group.

(7) The hardcoat agent composition described in any one of the above (1) to (6) wherein the fluorine-containing polyether compound (A) is a compound in which (meth) acryloyl is introduced via urethane bond into a hydroxyl group of a fluorine-containing polyether compound having a hydroxyl group at the end and also having a perfluoropolyether unit.

(8) The hardcoat agent composition described in any one of the above (1) to (7) wherein additionally contained are the inorganic microparticles (C) with a mean particle diameter of 100 nm or less (9) The hardcoat agent composition described in the above (8) wherein the inorganic microparticles (C) ranging from 5 parts by weight or greater to 500 parts by weight or less are contained in relation to 100 parts by weight of the curable compound (B).

(10) The hardcoat agent composition described in the above (8) or (9) wherein the inorganic microparticles (C) are microparticles of metal (or metalloid) oxide or microparticles of metal (or metalloid) sulfide.

(11) The hardcoat agent composition described in any one of the above (8) to (10) wherein the inorganic microparticles (C) are silica microparticles.

(12) The hardcoat agent composition described in any one of the above (8) to (11) wherein the inorganic microparticles (C) are surface-modified by a hydrolysable silane compound having an active energy ray reactive group.

The above hardcoat agent compositions are useful as hardcoat agent compositions for an optical information medium in particular.

(13) A substance the surface of which is given a hardcoat layer having a curable substance of the hardcoat agent composition described in any one of the above (1) to (12). In this invention, substances to which impartation of a hardcoat layer is required on the surface include an optical information medium, optical lens, optical filter, anti-reflection film and various display elements such as a liquid crystal display, CRT display, plasma display and EL display.

(14) An optical information medium having a film substance composed of single or multiple layers containing at least a recording layer or a reflecting layer on a supporting substrate, the optical information medium wherein at least either the surface of the above-mentioned supporting substrate or that of the above-mentioned film substance is formed by the hardcoat layer containing a curable substance of the hardcoat agent composition described in any one of the above (1) to (12).

(15) The optical information medium described in the above (14) wherein, regarding the surface of the above-mentioned supporting substrate and that of the above-mentioned film substance, a surface which is regarded as a light entering side is formed by the above-mentioned hardcoat layer.

(16) An optical information medium having an information recording layer on the supporting substrate and a light transmitting layer on the information recording layer and also having a hardcoat layer containing a curable substance of the hardcoat agent composition described in any one of the above (1) to (12) on the light transmitting layer.

(17) A method for producing an optical information medium, the method comprising the steps of forming a film substance composed of single or multiple layers containing at least a recording layer or a reflecting layer on a supporting substrate, coating the hardcoat agent composition described in any one of the above (1) to (12) to at least either the surface opposite the surface on which the above-mentioned film substance of the above-mentioned supporting substrate is formed or the surface of the above-mentioned film substance and effecting a cure by irradiation of an active energy ray to form the hardcoat layer.

In this invention, optical information media include various media such as a playback-only optical disk, optical recording disk and magneto optical recording disk.

According to the invention, a hardcoat agent composition effective in forming a hardcoat layer excellent in antifouling property and lubricating property as well as in scratch resistance and wear resistance is provided on the surface of various substances.

In addition, a substance having on the surface the hardcoat layer formed by using the above-mentioned hardcoat agent composition is provided according to the invention.

In particular, an optical information medium excellent in antifouling property and lubricating property as well as in scratch resistance and wear resistance on the surface of a record and/or playback beam entering side is provided according to the invention.

BEST MODE FOR CARRYING OUT THE INVENTION

Figure 1:
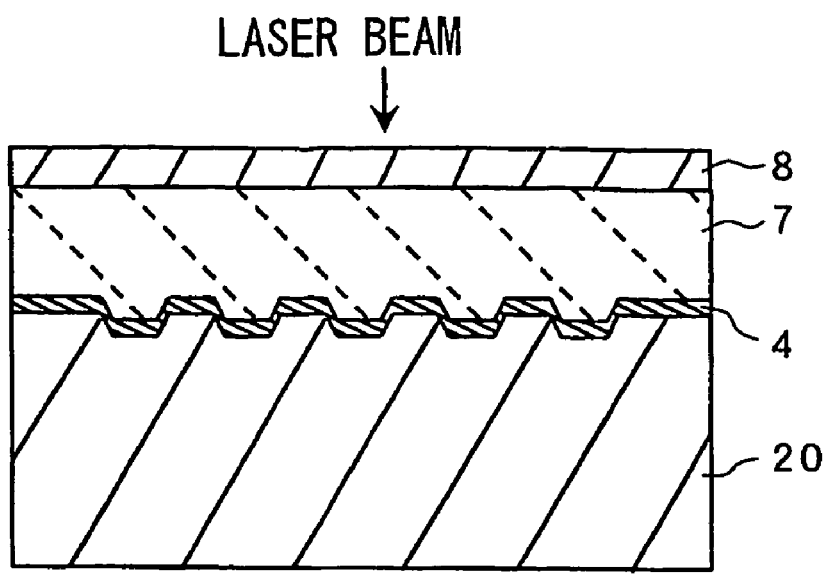
FIG. 1 is an schematic diagram illustrating an example of the optical disk layer structure of the invention.

First, a description is given of the hardcoat agent composition of the invention.

The hardcoat agent composition of the invention comprises the fluorine-containing polyether compound (A) having a perfluoropolyether unit, urethane bond and active energy ray reactive group and the curable compound (B) having equal to or more than 2 active energy ray polymerizing groups in the molecule.

The curable compound (B) is a compound other than the above-mentioned (A) and a primary composition of the curable composition in the hardcoat agent composition, forming a matrix of the hardcoat layer obtained after a cure. The hardcoat agent composition contains as the curable compound (B) 65 to 100% by weight of the curable compound (Bt) having 3 or more active energy ray polymerizing groups in the molecule and 0 to 35% by weight of the curable compound (Bd) having 2 active energy ray polymerizing groups in the molecule on the basis of the curable compound (B).

Since the active energy ray curable compound (Bt) has 3 or more active energy ray polymerizing groups in the molecule, it can be given a sufficient hardness as a hardcoat layer by itself after a cure. On the contrary, since the active energy ray curable compound (Bd) has only 2 active energy ray polymerizing groups in the molecule, it is difficult to give a sufficient hardness as a hardcoat layer after a cure. Accordingly, it is preferable to use the curable compound (Bt) as a primary composition of the curable compound (B) and to use the curable compound (Bd) with in the range of the above parts by weight, if used.

The curable compound (Bt) and the curable compound (Bd) are compounds other than the fluorine-containing polyether compound (A). If they are compounds which, respectively, contain 3 or more and 2 or more active energy ray polymerizing groups in the molecule, multifunctional monomers or oligomers may be acceptable and their structures are not particularly restricted. The curable compound (Bt) and the curable compound (Bd) should be free of fluorine in order to obtain a high hardness of the hardcoat layer. Active energy ray polymerizing groups contained in the curable compound (Bt) and the curable compound (Bd) will be selected from (meth) acryloyl groups, vinyl groups and mercapto groups.

Of these active energy ray curable compounds (Bt) and (Bd), compounds having (meth)acryloyl groups include urethane acrylate, epoxy acrylate and ester acrylate, and, to be more specific, they include the following but are not restricted to them; 1,6-hexanediol di(meth)acrylate, triethyleneglycol di(meth)acrylate, ethyleneoxide modified bisphenol A di(meth)acrylate, trimethylolpropane tri(meth)acrylate, pentaerythritol tetra(meth)acrylate, ditrimethylolpropane tetra (meth)acrylate, dipentaerythritol hexa(meth)acrylate, pentaerythritol tri(meth)acrylate and 3-(meth)acryloyl oxyglycerin mono(meth)acrylate.

Further, vinyl group-containing compounds include the following but are not necessarily restricted to them; ethylene glycoldivinylether, pentaerythritol divinyl ether, 1,6-hexanediol divinylether, trimethylolpropanedivinylether, ethyleneoxide modified hydroquinone divinylether, ethyleneoxide modified bisphenol A divinylether, pentaerythritol trivinylether, dipentaerythritol hexavinylether and di(trimethylolpropane)polyvinylether.

Further, mercapto group-containing compounds include the following but not necessarily restricted to them; ethyleneglycol bis(thioglycolate), ethylene glycolbis(3-mercapto propionate), trimethylolpropanetris(thioglycorate), trimethylolpropanetris(3-mercapto propionate), pentaerythritoltetrakis(mercapto acetate), pentaerythritoltetrakis (thioglycorate) and pentaerythritoltetrakis(3-mercapto propionate).

The active energy ray curable compound (Bt) may be used solely or in combination with 2 or more types of it in forming the hardcoat agent composition of this invention. Where the active energy ray curable compounds (Bd) are used together, only one type of the curable compound (Bd) may be used, or two or more types of the compound may be used in combination.

A monofunctional monomer may also be used as a curable composition within a range which can provide a sufficient hardness as a hardcoat layer, in addition to the curable compound (Bt) and the curable compound (Bd) in forming the hardcoat agent composition.

The fluorine-containing polyether compound (A) is used to impart a water repellent property and/or lubricating property to the hardcoat layer surface. The fluorine-containing polyether compound (A) is a compound which has at least one perfluoropolyether unit, at least one urethane bond and at least one active energy ray reactive group.

The perfluoropolyether unit can be expressed by, for example, —[$CF_2CF_2O$]—, —[$CF_2O$]— and others. Active energy ray reactive groups include the (meth)acryloyl group and vinyl group. Depending on a site of perfluoropolyether, water repellent property and/or lubricating property are imparted to the hardcoat layer surface. The perfluoropolyether site tends to concentrate more easily on the hardcoat layer surface than the fluorinated alkyl site of fluorinated alkyl(meth)acrylate, thus imparting a more excellent water repellent property and/or lubricating property. Having an active energy ray reactive group will allow cross-linkage reaction to take place among fluorine-containing polyether compounds (A) and between the active energy ray curable compounds (Bt) and/or (Bd) by active energy ray irradiation on a cure of the hardcoat, thereby attaining an improved fixation into the hardcoat layer. As a result, obtainable is a hardcoat layer extremely excellent in antifouling property and lubricating property under various storage and use conditions.

The fluorine-containing polyether compound (A) preferably has the number average molecular weight (Mn) from 500 or greater to 10,000 or lower on the basis of polystyrene standard determined by GPC (Gel Permeation Chromatography). Use of the compound (A) having this range of the number average molecular weight makes it possible to impart a desired water repellent property and/or lubricating property to the hardcoat layer surface, with mutual solubility maintained with other monomers and oligomer compositions in the hardcoat agent composition.

It is preferable that the fluorine-containing polyether compound (A) has 2 or more active energy ray reactive groups in the molecule because such a compound is able to increases the fixation into the hardcoat layer and also improve the antifouling property and lubricating property. It is more preferable that the fluorine-containing polyether compound (A) has an active energy ray reactive group on both ends of the molecule because such a compound is able to further improve the fixation into the hardcoat layer, and it is most preferable that it has two or more active energy ray reactive groups on both ends of the molecule. An increased fixation into the hardcoat layer will provide a hardcoat layer extremely excellent in solvent resistance.

The fluorine-containing polyether compound (A) is based on a fluorine-containing polyether compound having a hydroxyl group and perfluoropolyether unit at the end, wherein a (meth) acryloyl group is introduced via urethane bond into the hydroxyl group. Fluorine-containing polyether compounds as a raw material include the following compounds but are not restricted to them.

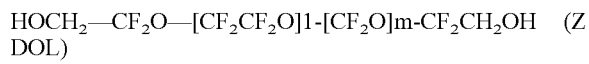

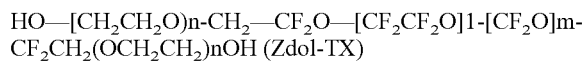

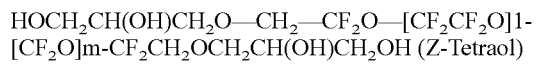

Fluorine-containing polyether compounds (A) include, for example, those represented by the following chemical structure 1 or 2.

loyloxyethyl isocyanate to react with the terminal hydroxyl group of fomblin Z DOL [alcohol modified perfluoropolyether (Ausimont K.K.)].

The fluorine-containing polyether compound (A) may be used solely or in combination with 2 or more types of it in forming the hardcoat agent composition.

The hardcoat agent composition of the invention preferably contains fluorine-containing polyether compound (A) ranging from 0.01 parts by weight or greater to 3 parts by weight or less in relation to 100 parts by weight of a nonvolatile part of the composition, more preferably from 0.05 parts by weight or greater to 1.5 parts by weight or less. Allowing the fluorine-containing polyether compound (A) to contain in a quantity greater than 3 parts by weight will improve the lubricating property but lower the hardness of the hardcoat layer, and insufficiently improve the lubricating property in a quantity of less than 0.01 parts by weight. The nonvolatile part is a compound remaining in the hardcoat layer after a cure, including a monofunctional monomer and optional compositions to be described later such as inorganic microparticles (C), photopolymerization initiators and various additive agents, in addition to the fluorine-containing polyether compound (A) and the curable compound (B).

It is preferable that the hardcoat agent composition of the invention contains inorganic microparticles (C) with a mean particle diameter of 100 nm or less. It should contain inorganic microparticles (C) with a mean particle diameter of 100 nm or less, and preferably 20 nm or less for securing trans-

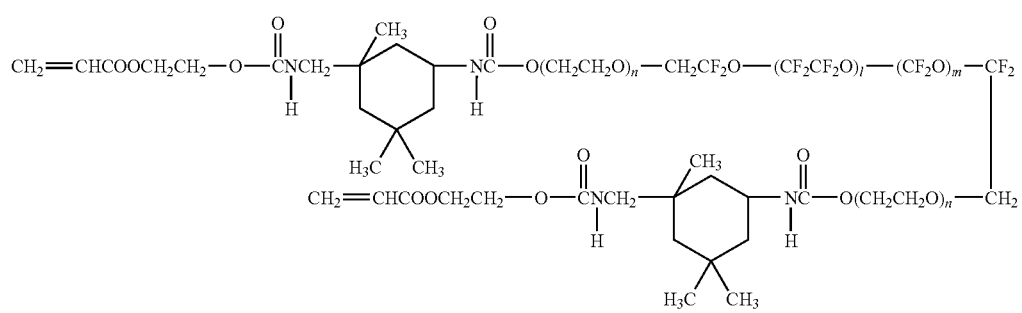

1

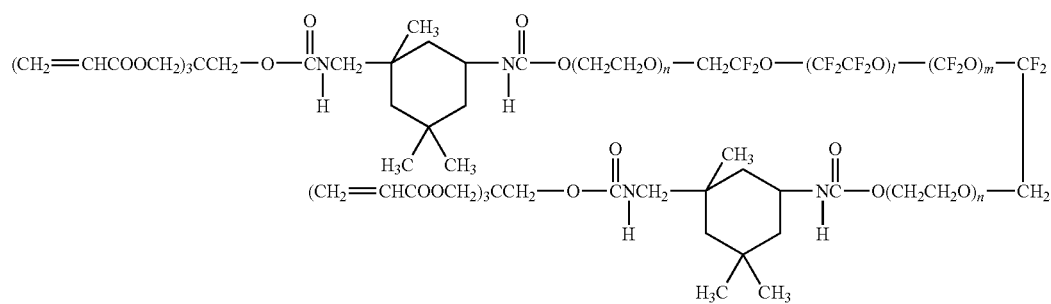

2

Fluorine-containing polyether compounds (A) include, as an additional example, the following compound.

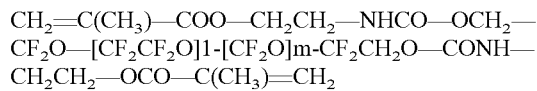

A compound into which the methacryloyl group is introduced (MOI modification) via urethane bond by allowing methacryparency of the hardcoat layer and 5 nm or greater for considering possible restrictions in manufacturing colloid solutions.

The inorganic microparticles (C) include, for example, microparticles of metal (or metalloid) oxide or those of metal (or metalloid) sulfide. Metals (or metalloids) for inorganic microparticles include, for example, Si, Ti, Al, Zn, Zr, In, Sn and Sb. In addition to the oxide and sulfide, Se compounds, Te compounds, nitrides and carbides may be used as well. Inorganic microparticles include, for example, microparticles of silica, alumina, zirconia and titania, among which silica microparticles are preferable. The addition of these inorganic microparticles to the hardcoat agent composition are able to increase wear resistance to the hardcoat layer.

Of the above-mentioned silica microparticles, preferably used are those which are surface-modified by a hydrolysable silane compound having active energy ray-reactive groups. These reactive silica microparticles will be fixed into a polymer matrix through a cross-linkage reaction caused by active energy ray irradiation on a cure of the hardcoat. Such reactive silica microparticles include, for example, the reactive silica particle described in Japanese Published Unexamined Patent Application No. H9-100111, which can be used favorably in the present invention.

Where the inorganic microparticles (C) are used in the hardcoat agent composition of the invention, the inorganic microparticles (C) should be preferably contained in a range from 5 parts by weight or greater to 500 parts, by weight or less in relation to 100 parts by weight of the curable compound (B) and more preferably the inorganic microparticles (C) should be contained in a range from 20 parts by weight or greater to 200 parts by weight or less. The addition of the inorganic microparticles (C) in a quantity exceeding 500 parts by weight will reduce the film strength of the hardcoat layer, whereas addition of the inorganic microparticles (C) in a quantity of 5 parts by weight or less will impart an insufficient wear resistance to the hardcoat layer.

The hardcoat agent composition of the invention may include known photopolymerization initiators. Photopolymerization initiators are not required when an electron ray is used as an active energy ray, but they are required when an ultraviolet ray is used. Photopolymerization initiators may be appropriately selected from ordinary grades of acetophenone, benzoin, benzophenone, thioxanthone and others. Of photopolymerization initiators, photo radical initiators include, for example, DAROCURE 1173, IRGACURE 651, IRGACURE 184, IRGACURE 907 (each of which is produced by Ciba Specialty Chemicals). The photopolymerization initiators are contained, for example, in a range from 0.5 to 5 weight % in relation to the sum of the above-mentioned (A), (Bt), (Bd) and (C) in the hardcoat agent composition.

The hardcoat agent composition of the invention may also include non-polymerizing diluents, organic fillers, polymerization inhibitors, antioxidants, ultraviolet ray absorbing agents, light stabilizers, antifoaming agents and leveling agents, whenever necessary.

The hardcoat agent composition may be manufactured by mixing the above compositions in an ordinary method. It is desirable to prepare the hardcoat agent composition at a coat-applicable viscosity. The hardcoat agent composition of the invention can be structured by the procedures as described above.

Then, an explanation is made by referring to figures about the optical information medium (hereinafter abbreviated as optical disk from time to time) of the present invention in which the above-mentioned hardcoat agent compositions are used as well as the production method.

The optical information medium of the invention is a medium having a film substance composed of single or multiple layers containing at least a recording layer or a reflecting layer on a supporting substrate and wherein at least either the surface of the above-mentioned supporting substrate or that of the above-mentioned film substance is formed by the hardcoat layer containing a curable substance of the above-mentioned hardcoat agent composition. It is favorable that, in the optical information medium of the invention, at least either the surface of the above-mentioned supporting substrate or that of the above-mentioned film substance or preferably the surface which is to be as a light entering side of the record/playback beam is formed by the hardcoat layer made with a curable substance of the above-mentioned hardcoat agent composition.

1. Optical information medium wherein the surface of the film substance is to be the record/playback beam entering surface.

First, a description is given of the optical information medium wherein the surface of the film substance is to be the record/playback beam entering surface.

FIG. 1 is an schematic diagram illustrating an example of the optical disk layer structure of the invention. The optical disk is a recording medium, having the recording layer (4) as an information recording layer on the supporting substrate (20) relatively high in rigidity, having the light transmitting layer (7) on the recording layer (4), and having the light transmitting hardcoat layer (8) on the light transmitting layer (7). The hardcoat layer (8) is used as the record/playback beam entering side, and a record or playback laser beam enters into the recording layer (4) through the hardcoat layer (8) and the light transmitting layer (7). Thickness of the light transmitting layer (7) is preferably from 30 to 150 μm including the hardcoat layer (8) and more preferably from 70 to 150 μm. Such an optical disk is, for example, Blu-ray Disc. The pencil hardness test of the hardcoat layer (8) shows B or higher in hardness.

Although not given in the figure, such an optical disk is also included in the invention that has 2 or more recording layers by having another recording layer on the recording layer (4) through a spacer layer. In this case, the optical disk has the light transmitting layer (7) and the hardcoat layer (8) at the recording layer further most from the supporting substrate (20).

The invention can be applied to any type of a recording layer. More particularly, it can be applied, for example, to a phase-change type recording medium, a pit-forming type recording medium or a magneto optical recording medium. In most cases, a dielectric layer or reflecting layer is provided at least on one side of the recording layer for protecting the recording layer or attaining the optical effect, which is however, deleted in FIG. 1. The invention can be applied not only to the recordable types as illustrated but also to playback-only types. In such an instance, a pit array is formed in an integrated fashion with the supporting substrate (20), and the reflecting layer (metal layer or dielectric multiple layers) covering the pit array makes up the information recording layer.

A description is given of the optical information medium used in the phase-change type recording medium of the invention.

Figure 2:
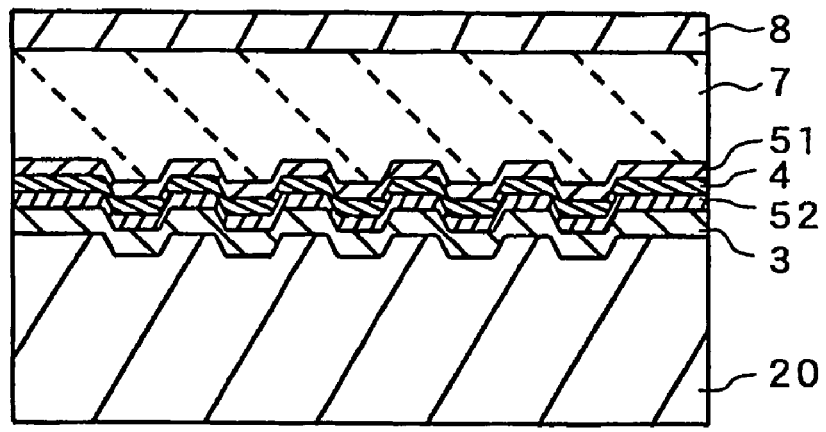
FIG. 2 is an schematic diagram illustrating an example of the optical disk layer structure of the invention.

FIG. 2 is an schematic diagram illustrating an example of the optical disk layer structure of the invention. In FIG. 2, the optical disk has the reflecting layer (3), the second dielectric layer (52), the phase-change recording material layer (4) and the first dielectric layer (51) on the surface where minute concavities and convexities such as information pits for the supporting substrate (20) and pregrooves, etc., are formed in the same order, having the light transmitting layer (7) on the first dielectric layer (51), and also having the hardcoat layer (8) on the light transmitting layer (7). In this instance, the reflecting layer (3), the second dielectric layer (52), the phase-change recording material layer (4) and the first dielectric layer (51) make up the information recording layer. Further, the above-mentioned information recording layer and the light transmitting layer (7) make up film substances necessary for recording or playback. The optical disk is used so that laser light for recording and playback enters through the hardcoat layer (8) and the light transmitting layer (7), namely from the film substance.

Thickness of the supporting substrate (20) is 0.3 to 1.6 mm and preferably 0.5 to 1.3 mm. Minute concavities and convexities such as information pits and pregrooves are formed on the surface where the recording layer (4) is formed.

Since the supporting substrate (20) is used as mentioned above in such a way that the laser light enters from the film substance side, it is not necessarily optically transparent. Materials for preparing a transparent supporting substrate include acrylic resins such as polycarbonate resin and polymethyl methacrylate (PMMA) and various plastic materials such as polyolefin resin. Alternatively, glass, ceramics or metals may be used. Concavity and convexity patterns are often produced by injection molding where plastic materials are used and by a photopolymer method (2P method) where none-plastic materials are used.

Usually, the reflecting layer (3) is formed on the supporting substrate (20) by the spattering method. Materials of the reflecting layer include metal elements, metalloid elements, semiconductor elements, and a single or complicated compound thereof. To be more specific, these materials may be selected, for example, from known reflecting layer materials such as Au, Ag, Cu, Al and Pd. The reflecting layer is preferably formed as a thin film with a thickness of 20 to 200 nm.

The second dielectric layer (52), the phase-change recording material layer (4) and the first dielectric layer (51) are formed in this order by the spattering method on the reflecting layer (3) or directly on the supporting substrate (20) where no reflecting layer is provided.

The phase-change recording material layer (4) undergoes a reversible change by laser light irradiation from a crystalline state to amorphous state and vice versa, and is formed with materials different in optical characteristics between these states. For example, these materials include Ge—Sb—Te, In—Sb—Te, Sn—Se—Te, Ge—Te—Sn, In—Se—Tl and In—Sb—Te. Further, at least one type of metal selected from Co, Pt, Pd, Au, Ag, Ir, Nb, Ta, V, W, Ti, Cr, Zr, Bi, In, etc., may be sparingly added to these materials, or reducing gas such as nitrogen may be sparingly added. Thickness of the recording material layer (4) is not particularly restricted and may be 3 to 50 nm, for example.

The second dielectric layer (52) and the first dielectric layer (51) are formed on both surfaces of the recording material layer (4) up and down between the surfaces. The second dielectric layer (52) and the first dielectric layer (51) have a function as an interference layer for adjusting optical characteristics, besides having functions of mechanical and chemical protection to the recording material layer (4). The second dielectric layer (52) and the first dielectric layer (51) may be made up with a single layer or multiple layers.

It is preferable that the second dielectric layer (52) and the first dielectric layer (51) are formed with oxide, nitride, sulfide, fluoride or their compounds, respectively, containing at least one type of the metal selected from Si, Zn, Al, Ta, Ti, Co, Zr, Pb, Ag, Zn, Sn, Ca, Ce, V, Cu, Fe and Mg. It is also preferable that the second dielectric layer (52) and the first dielectric layer (51) are, respectively, 0.1 or less in the attenuation coefficient k.

Thickness of the second dielectric layer (52) is not restricted in particular and is preferably 20 to 150 nm, for example. Thickness of the first dielectric layer (51) is not restricted in particular either and is preferably 20 to 200 nm, for example. Reflection may be adjusted by selecting these dielectric layers (52) and (51) with the above thickness.

The light transmitting layer (7) is formed on the first dielectric layer (51) by using an active energy ray curable material or a light transmitting sheet such as polycarbonate sheets.

Active energy ray curable materials used as the light transmitting layer (7) may be selected from ultraviolet ray curable materials and electron ray curable materials on the condition that they are optically transparent, lower in optical absorption and reflection at the laser wave region used and also lower in the birefringence.

More particularly, active energy ray curable materials are preferably made up with ultraviolet ray (electron ray) curable compounds or their polymerization compositions. These materials include ester compounds such as acrylic acid and methacrylic acid, acrylic double bond compounds such as epoxy acrylate and urethane acrylate, allyl double bond compounds such as diallylphthalate, and monomers, oligomers and polymers, etc., in which groups cross-linked or polymerized by ultraviolet ray irradiation of unsaturated double bond, etc., of maleic acid derivatives are incorporated or introduced into molecules. Preferable materials are multi-functional groups, and particularly preferable materials are 3 or greater functional groups. The materials may be used solely or in combination with 2 or more types of them. A monofunctional group may be used, as required.

Compounds with a molecular weight of 2000 or less are preferable as ultraviolet ray curable monomers, whereas those of a molecular weight of 20 to 10000 are preferable as oligomers. They include styrene, ethyl acrylate, ethylene glycol diacrylate, ethylene glycol dimethacrylate, diethylene glycol diacrylate, diethylene glycolmethacrylate, 1,6-hexanediol diacrylate and 1,6-hexanediol dimethacrylate, and particularly preferable are pentaerythritoltetra(meth)acrylate, pentaerythritoltri(meth)acrylate, trimethylolpropanetri (meth)acrylate, trimethylolpropane di(meth)acrylate and phenolethylene oxide-added (meth)acrylate. In addition, ultraviolet ray curable oligomers include acrylic modifications such as oligoester acrylate and urethane erastomer.

Ultraviolet ray (electron ray) curable materials may include known photopolymerization initiators. Photopolymerization initiators are not required when an electron ray is used as an active energy ray, but they are required when an ultraviolet ray is used. Photopolymerization initiators may be appropriately selected from ordinary grades of acetophenone, benzoin, benzophenone, thioxanthone and others. Of photopolymerization initiators, photo radical initiators include, for example, darocure 1173, irgacure 651, irgacure 184, irgacure 907 (all of which are produced by Ciba Specialty Chemicals). The photo polymerization initiators are contained, for example, in a range 0.5 to 5 weight % in relation to the above-mentioned (electron ray) curable composition.

Epoxy compounds and compositions which contain photo cation polymerization catalysts are also preferably used as ultraviolet ray curable materials. Alicyclic epoxy compounds are preferable and those having 2 or more epoxy groups in the molecule are in particular preferable as epoxy compounds. Those containing one or more types of 3,4-epoxy cyclohexylmethy-3,4-epoxycyclohexane carboxylate, bis(3,4-epoxy cyclohexylmethyl) adipate, bis(3,4-epoxy cyclohexyl) adipate, 2-(3,4-epoxy cyclohexyl 5,5-spiro-3,4-epoxy)cyclohexane methadioxane, bis(2,3-epoxy cyclopentyl)ether and vinylcyclohexene dioxide are preferable as alicyclic epoxy compounds. The epoxy equivalence of alicyclic epoxy compounds is not restricted particularly and preferably 60 to 300 and more preferably 100 to 200 because a better cure can be obtained in these ranges.

Any known photo cation polymerization catalysts may be used in the invention, with no particular restriction placed.

For example, one or more types of metal fluoro borate and a complex of boron trifluoride, bis(perfluoroalkyl sulfonyl) methane metallic salt, aryldiazonium compound, aromatic onium salt of 6A series elements, aromatic onium salt of 5A series elements, dicarbonyl chelate of 3A series to 5A series elements, thiopyrylium salt, 6A series elements having MF6 anion (however, M is P, As or Sb), triarylsulfonium complex salt, aromatic iodonium complex salt, aromatic sulfonium complex salt, etc., may be used. One or more types of polyarylsulfonium complex salt, aromatic sulfonium salt or iodonium salt of halogen-containing complex ion and aromatic onium salt of 3A series elements, 5A series elements and 6A series elements may be particularly used. Content of the photo cation polymerization catalysts are, for example, 0.5 to 5 weight % in relation to the above-mentioned ultraviolet ray curable composition.

Active energy ray curable materials having the viscosity of 1,000 to 10,000 cp (25° C.) are preferably used as the light transmitting layer.

Coating of the active energy ray curable material on the first dielectric layer (51) for forming the light transmitting layer (7) may be effectively carried out by the spin coating method. It is desirable that the curable material after coating is cured by irradiation of ultraviolet ray. In this instance, ultraviolet ray irradiation may be carried out for a number of multiple divided steps. Coating operation of the active energy ray curable material may be carried out for a number of multiple divided steps, or ultraviolet ray irradiation may be carried out after individual coating operations. Ultraviolet ray irradiation is carried out for a number of multiple divided steps to attain a step-wise cure of the resin, by which the stress resulting from cure and constriction concentrated on a disk can be reduced, thus making smaller the stress which finally accumulates on the disk. The operation is preferable, because even where the light transmitting layer (7) is thick as mentioned in the above, a disk excellent in mechanical characteristics can be prepared.

Alternatively, it is also possible in the invention that a light transmitting resin sheet can be used to form a light transmitting layer. In this case, the active energy ray curable material similar to that for the light transmitting layer is coated on the first dielectric layer (51) to form a resin material layer which is not cured. A light transmitting sheet as the light transmitting layer (7) is placed on the resin material layer which is not cured, active energy rays such as ultraviolet ray are then irradiated to allow the resin material layer to cure, by which the light transmitting sheet is attached to give the light transmitting layer (7). Preferable active energy ray curable materials used as the resin material layer are those having the viscosity of 3 to 500 cp (25° C.). It is preferable to coat the resin material layer by the spin coating method. Thickness of the resin material layer is preferably, for example, 1 to 50 μm after the cure.

Polycarbonate sheets having a desired thickness selected from, for example, 30 to 150 μm can be used as a light transmitting sheet. To be more specific, the light transmitting layer (7) is formed by placing the polycarbonate sheet having a desired thickness on the resin material layer which is not cured in a vacuum (0.1 atmospheric pressure or less) and then returning the resin material layer to an atmospheric pressure for ultraviolet ray irradiation, thus allowing the layer to cure.

The above-mentioned hardcoat agent composition is used to form the hardcoat layer (8) on the light transmitting layer (7). Namely, the above-mentioned hardcoat agent composition is coated on the light transmitting layer (7) to form an uncured hardcoat layer and then active energy rays such as ultraviolet ray, electron ray and visible ray are irradiated to allow the uncured layer to cure, which is provided as the hardcoat layer (8).

Since there is no restriction on the coating method, spin coating method, dip coating method or gravure coat method may be used. Alternatively, where a light transmitting sheet is used as the light transmitting layer (7), the hardcoat layer (8) is formed in advance by the method similar to that described above on a lengthy light-transmitting bulk sheet and the bulk is cut off in a disk shape. Then, as described above, the resin material layer may be placed on the uncured resin material layer, thereby allowing it to cure.

Where the above-mentioned hardcoat agent composition contains a non-reactive dilution organic solvent, the above-mentioned hardcoat agent composition is coated to form an uncured hardcoat layer, and then the non-reactive organic solvent is removed by heating and drying, and subsequently the active energy ray is irradiated, thereby allowing the uncured layer to cure, which is used as the hardcoat layer (8). The dilution organic solvent is used to coat the hardcoat agent composition and the organic solvent is removed by heating and drying, by which the fluorine-containing polyether compound (A) more easily concentrates near the vicinity of the surface of uncured hardcoat layer, resulting in a higher content of fluorine-containing polyether near the vicinity of the surface of the hardcoat layer (8) after the cure, thereby easily providing a greater improvement in the lubricating property. In this instance, the heating and drying temperature is preferably, for example, 40° C. or higher to 100° C. or lower. The heating and drying time is, for example, 30 seconds or longer to 8 minutes or shorter, preferably from 1 minute or longer to 5 minutes or shorter, and more preferably 3 minutes or longer to 5 minutes or shorter. No particular restriction is given to non-reactive dilution organic solvents that may be used in the invention, including propylene glycol monomethylether acetate, propyleneglycol monomethylether, ethylene glycol monomethylether, butyl acetate, methyl ethyl ketone, methyl isobutyl ketone and isopropyl alcohol. Active energy rays may be used by selecting appropriately from those such as an ultraviolet ray, electron ray and visible ray, and an ultraviolet ray or electron ray is used preferably. Thickness of the hardcoat (8) after a cure should be 0.5 to 5 μm.

As described above, the phase-change type optical recording disk illustrated in FIG. 2 is obtained as an optical information medium in which the film substance surface is to be the record/playback beam entering surface.

2. An optical information medium in which the supporting substrate surface is to be the record/playback beam entering surface:

Next, a description is given of the optical information medium in which the supporting substrate surface is to be the record/playback beam entering surface.

Figure 3:
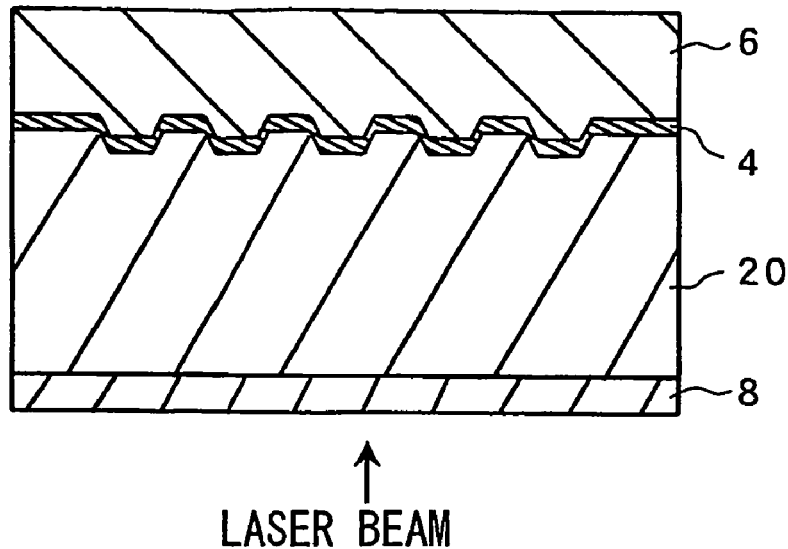
FIG. 3 is an schematic diagram illustrating another example of the optical disk layer structure of the invention.

FIG. 3 is an schematic diagram illustrating an example of other optical disk layer structures of the invention. The optical disk illustrated in FIG. 3 has the information recording layer (4) on one or the other surface of the light transmitting supporting substrate (20) and the protective layer (6) on the information recording layer (4) and also has the light transmitting hardcoat layer (8) on the other surface of the supporting substrate (20). The hardcoat layer (8) is to be the record/playback beam entering surface, and the laser beam for recording and playback enters into the recording layer (4) through the hardcoat layer (8) and the supporting substrate (20).

Figure 4:
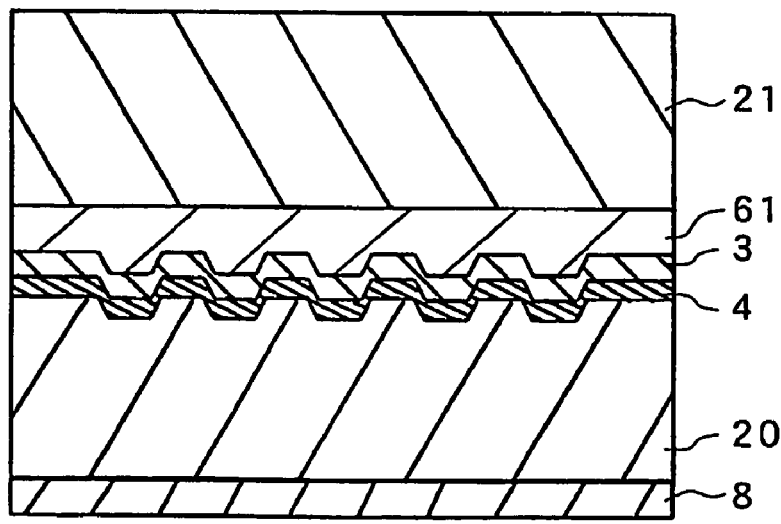
FIG. 4 is an schematic diagram illustrating another example of the optical disk layer structure of the invention.

FIG. 4 is an schematic diagram illustrating an example of other optical disk layer structures of the invention. The optical recording disk illustrated in FIG. 4 has the organic dye layer (4) on one or the other surface of the light transmitting supporting substrate (20) and the supporting substrate (21) bonded between the reflecting layer (3) on the dye layer (4) and the protection/adhesion layer (61) on the reflecting layer (3) and has the light transmitting hardcoat layer (8) on the other surface of the supporting substrate (20), and the hardcoat layer (8) is to be the record/playback beam entering surface. In this instance, the dye layer (4) and the reflection layer (3) make up the information recording layer. Such an optical disk includes a recordable type DVD-R.

In addition to the recordable DVD-R illustrated in FIG. 4, various products such as playback-only DVD-ROM, rewritten DVD-RAM and DVD-RW have been commercially available. DVD-Video, DVD-ROM and others are available as playback-only DVD. In these optical disks, when the light transmitting supporting substrate is formed, concavities and convexities called pits in which an information signal is recorded are provided, on which a metal (such as Al) reflecting layer is formed and a protective layer is additionally formed. Another supporting substrate is bonded on the protective layer through the adhesion layer, thus giving a final optical disk. In the case of a rewritable DVD, the information recording layer may be structured, as described likewise in the phase-change type recording medium of the above-mentioned 1.

A light transmitting base plate is used as the supporting substrate (20). The light transmitting supporting substrate (20) has been conventionally produced by injection molding of polycarbonate resins, on the surface of which various types of information, for example, prepits and pregrooves, are formed. No particular restriction is given to materials used for this purpose, and resins such as polyolefin resins are favorably used. Alternatively, the supporting substrate may be produced by forming prepits or pregrooves on a glass plate following the 2P method.

An organic dye dissolved in a solvent by the spin coat method is coated on the supporting substrate (20) and dried to obtain the organic dye layer (4) with a desired film thickness. The organic dye may be selected from various dyes such as cyanine dye, azo dye and phthalocyanine dye. A method for forming the dye layer may include the coating method, screen printing method and evaporation method, in addition to the spin coat method, and the film thickness to be formed may be appropriately selected depending on dyes used for this purpose.

Where the spin coat method is used, dye compositions are dissolved in a solvent and used as an organic dye solution. The solvent should be selected from that capable of attaining a sufficient dissolution of the dye and not negatively affecting the light transmitting base plate. Preferable concentrations are 0.01 to 10% by weight.

Solvents include, for example, alcoholic solvents such as methanol, ethanol, isopropyl alcohol, octafluoropentanol, arylalchol, methyl cellosolve, ethyl cellosolve, tetrafluoropropanol; aliphatic or alicyclic hydrocarbon solvents such as hexane, heptane, octane, decane, cyclohexane, methyl cyclohexane, ethyl cyclohexane, dimethylcyclohexane; aromatic hydrocarbon solvents such as toluene, xylene and benzene; halogen hydrocarbon solvents such as carbon tetrachloride, chloroform, tetrachloroethane and dibromoethane; ether-based solvents such as diethylether, dibutylether, diisopropylether and dioxane; ketone solvents such as 3-hydroxy-3-methyl-2-butane; ester solvents such as ethyl acetate and methyl lactate; and water. Those which do not affect the base material may be appropriately selected therefrom. These solvents may be used solely or in combination with two or more types of them.

Film thickness of the organic dye layer is not particularly restricted and preferably 10 to 300 nm and more preferably 60 to 250 nm.

The reflecting layer (3) is provided on the organic dye layer (4). Materials of the reflecting layer include those having a sufficiently high reflection coefficient of the wavelength of reproduced light, for example, elements such as Au, Ag, Cu, Al, Ni, Pd, Cr and Pt were used solely or as an alloy. The materials may include the elements not described above, for example, they are metals or melloids such as Mg, Se, Hf, V, Nb, Ru, W, Mn, Re, Fe, Co, Rh, Ir, Zn, Cd, Ga, In, Si, Ge, Te, Pb, Po, Sn and Bi.

The reflecting layer can be formed by the following methods but is not restricted to them, for example, the sputtering method, ion plating method, chemical evaporation method and vacuum evaporation method. An interlayer or adhesion layer made with known inorganic or organic compounds may also be provided on the base plate or the reflecting layer in order to improve the reflection coefficient and recording characteristics. Film thickness of the reflecting layer is not particularly restricted and preferably 10 to 300 nm and more preferably 80 to 200 nm.

The supporting substrate (21) is usually bonded via the protection and adhesion layer (61) on the reflecting layer (3). Materials used in the supporting substrate (21) are similar to those used in the above-mentioned supporting substrate (20). No particular restriction is placed on materials of the adhesion layer (61) as long as they are able to bond these supporting substrates (21) and (20) and protect the reflecting layer from external force. Known organic and inorganic substances may be used for this purpose. Organic substances include thermoplastic resins, thermosetting resins and ultraviolet ray setting resins. Further, inorganic substances include $SiO_2$, $SiN_4$, $MgF_2$ and $SnO_2$. Thermoplastic resins or thermosetting resins may be produced by dissolving them in an appropriate solvent to prepare a coating solution, which is coated and then dried. Ultraviolet ray setting resins may be produced by dissolving as they are or in an appropriate solvent to prepare a coating solution, then coating the solution and attaining a cure through irradiation of ultraviolet ray. Such ultraviolet ray setting resins include, for example, acrylate resins such as urethane acrylate, epoxy acrylate and polyester acrylate. These materials may be used solely or mixed with others, and can be applied as a single layer or multiple layers.

The protection and adhesion layer (61) may be formed by coating methods such as the spin coat method and casting method as well as by the sputtering method or the chemical evaporation method, as with formation of the recording layer.

Adhesives used for bonding include hot melt adhesives, ultraviolet-ray setting adhesives, heat-hardening adhesives and pressure sensitive adhesives, depending on the methods which meet individual requirements, for example, roll coater method, screen printing method and spin coat method. In the case of DVD-R, ultraviolet-ray setting adhesives are used by the screen printing method or the spin coat method comprehensively in view of workability, productivity and disk characteristics.

The light transmitting hardcoat layer (8) is formed on the other surface of the supporting substrate (20). Materials and formation of the hardcoat layer (8) are similar to those as described in item 1. The hardcoat layer (8) is to be the record/playback beam entering surface. A laser beam with a wavelength of 650 nm or 660 nm is used as a record/playback beam. A blue laser beam is also used.

As described so far, a DVD-R illustrated in FIG. 4 is obtained as an optical information medium in which the supporting substrate surface is to be the record/playback beam entering surface.

EXAMPLES

The present invention is described more specifically by referring to the following examples, which are, however, not interpreted to restrict the invention.

Synthetic Example of
Fluorinated Urethane Acrylate 1

Isophoronediisocyanate (85.0 mL, 0.401 mol) and dibutyl tin dilaurate (0.2 g) were placed into a three-neck flask equipped with an agitator and a Dimroth condenser, which was heated up to 70EC under a nitrogen atmosphere. Then, 210.0 g of perfluoropolyether diol (Fomblin Z DOL TX1000 made by Ausimont K.K.) (approximately 0.17 mol) was slowly added thereto, and the reaction mixture was heated at 70EC under a nitrogen atmosphere for 4 hours. Thereafter, dibutylhydroxy toluene (0.25 g) and 49.0 g of 2-hydroxyethyl acrylate (HEA made by Osaka Organic Chemical Industry Ltd.) (0.422 mol) were added to the reaction mixture and allowed to react for another 4 hours. The fluorinated urethane acrylate 1 with the above-mentioned chemical structure 1 was obtained, as described above.

Synthetic Example of
Fluorinated Urethane Acrylate 2

Isophoronediisiocyanate (85.0 mL, 0.401 mol) and dibutyl tin dilaurate (0.2 g) were placed into a three-neck flask equipped with an agitator and a Dimroth condenser, which was heated up to 70° C. under a nitrogen atmosphere. Then, 210.0 g of perfluoropolyether diol (Fomblin Z DOL TX1000 made by Ausimont K.K.) (approximately 0.17 mol) was slowly added thereto, and the reaction mixture was heated at 70° C. under a nitrogen atmosphere for 4 hours. Thereafter, dibutylhydroxy toluene (0.25 g) and 239.5 g of pentaerythritol triacrylate (PET-30 made by Nippon Kayaku Co., Ltd., mean functional group number of 3.4) were added to the reaction mixture and allowed to react for another 4 hours. The fluorinated urethane acrylate 2 with the above-mentioned chemical structure 2 was obtained, as described above.

Example 1

An optical recording disk sample with the layer structure as illustrated in FIG. 2 is prepared as follows.

The 100 nm-thick reflecting layer (3) made up with $Al_{98}Pd_1Cu_1$ (atomic ratio) was provided by the spattering method on the groove-formed surface of the disk-shaped supporting substrate (20) (made with polycarbonate, 120 mm in diameter and 1.1 mm in thickness) where grooves are formed for recording information. The above-mentioned grooves were $\lambda/6$ in depth when expressed by an optical length at wavelength of $\lambda=405$ nm. The recording track pitch in the groove recording method was 0.32 µm.

Then, an $Al_2O_3$ target was used to provide the 20 nm-thick second dielectric layer (5) on the surface of the reflecting layer (3) by the spattering method. An alloy target made with phase-changing materials was used to provide the 12 nm-thick recording layer (4) on the surface of the second dielectric layer (52) by the spattering method. The recording layer (4) (atomic ratio) was made up with $Sb_{74}Te_{18}$ ($Ge_7In_1$). A ZnS (80 mole %)–$SiO_2$ (20 mole %) target was used to provide the 130 nm-thick first dielectric layer (51) on the surface of the recording layer (4) by the spattering method.

Then, the radical polymerizing ultraviolet ray curable material with the following composition was coated on the surface of the first dielectric layer (51) by the spin coat method, and an ultraviolet ray was irradiated to provide the light transmitting layer (7) under conditions of irradiation strength, 160 W/cm; distance from the lamp, 11 cm; integrated light volume, 3 J/cm² so as to attain a layer thickness of 98 µm after a cure.

| (Light transmitting layer: compositions of the ultraviolet ray curable material) | |
|---|---|
| Urethane acrylate oligomer (Diabeam UK6035, Mitsubishi Rayon Co., Ltd.) | 50 parts by weight |
| Isocyanuric acid EO modified triacrylate (Aronics M315, Toagosei Co., Ltd.) | 10 parts by weight |
| Isocyanuric acid EO modified triacrylate (Aronics M215, Toagosei Co., Ltd.) | 5 parts by weight |
| Tetrahydrofurfuryl acrylate | 25 parts by weight |
| Photopolymerization initiator (1-hydroxycyclohexyl phenylketone) | 3 parts by weight |

The ultraviolet ray/electron ray curable type hardcoat agent with the following composition was then coated on the light transmitting layer (7) by the spin coat method to give a coating film, which was heated at 60° C. for 3 minutes in atmosphere to remove the diluting agent inside the film. Then, an ultraviolet ray was irradiated under conditions of irradiation strength, 160 W/cm; distance from the lamp, 11 cm; integrated light volume, 3 J/cm² to obtain the hardcoat layer (8) with a thickness of 2.4 µm after a cure.

| (Compositions of the hardcoat agent) | |
|---|---|
| Reactive group modified colloidal silica (dispersion solvent: propyleneglycol monomethylether acetate, non-volatile part: 40% by weight) | 100 parts by weight |
| Dipentaerythritol hexaacrylate | 48 parts by weight |
| 1,6-hexanediol diacrylate | 12 parts by weight |
| Propyleneglycol monomethylether acetate (Non-reactive diluting agent) | 40 parts by weight |
| Photopolymerization initiator (1-hydroxycyclohexyl phenylketone) | 2.5 parts by weight |
| The above-mentioned fluorinated urethane acrylate 1 | 0.5 parts by weight |

As described above, the disk sample was prepared.

Example 2

The disk sample was prepared similarly as in Embodiment 1 except that the above-mentioned fluorinated urethane acrylate 2 (0.5 parts by weight) was used in place of the above-mentioned fluorinated urethane acrylate 1 (0.5 parts by weight) in the composition of the hardcoat agent. The hardcoat layer (8) was 2.4 µm in thickness after a cure.

Example 3

The disk sample was prepared similarly as in Embodiment 1 except that the hardcoat agent with the following compositions was used in place of the hardcoat agent used in Embodiment 1. The hardcoat agent did not contain colloidal silica. The hardcoat layer (8) was 3.8 μm in thickness after a cure.

| (Compositions of the hardcoat agent) | |
|---|---|
| Dipentaerythritol hexaacrylate | 48 parts by weight |
| 1,6-hexanediol diacrylate | 12 parts by weight |
| Propyleneglycol monomethyether acetate (Non-reactive diluting agent) | 10 parts by weight |
| Photopolymerization initiator (1-hydroxycyclohexyl phenylketone) | 2.5 parts by weight |
| The above-mentioned fluorinated urethane acrylate 2 | 0.3 parts by weight |

Example 4

The disk sample was prepared similarly as in Embodiment 1 except that the hardcoat agent with the following compositions was used in place of the hardcoat agent used in Embodiment 1. The hardcoat agent did not contain 6-functional dipentaerythritol hexaacrylate but contained 2-functional diacrylate. The hardcoat layer (8) was 2.8 μm in thickness after a cure.

| (Compositions of the hardcoat agent) | |
|---|---|
| Reactive group modified colloidal silica (dispersion solvent: propyleneglycol Monomethylether acetate, nonvolatile part: 40% by weight) | 100 parts by weight |
| EO modified bisphenol A diacrylate (R-551, Nippon Kayaku Co., Ltd.) | 60 parts by weight |
| Propyleneglycol monomethylether acetate (Non-reactive diluting agent) | 6.7 parts by weight |
| Photopolymerization initiator (1-hydroxycyclohexyl phenylketone) | 2.5 parts by weight |
| The above-mentioned fluorinated urethane acrylate 2 | 0.5 parts by weight |

Comparative Example 1

The disk sample was prepared similarly as in Embodiment 1, except that perfluoropolyetherdiol (Ausimont K.K., Fomblin Z DOL TX 1000) (0.5 parts by weight) was used in place of the above-mentioned fluorinated urethane acrylate 1 (0.5 parts by weight) in the composition of the hardcoat agent. The hardcoat layer was 2.4 μm in thickness after a cure.

Comparative Example 2

The disk sample was prepared similarly as in Embodiment 4, except that perfluoropolyetherdiol (Ausimont K.K., Fomblin Z DOL TX1000) (0.5 parts by weight) was used in place of the above-mentioned fluorinated urethane acrylate 2 (0.5 parts by weight) in the composition of the hardcoat agent. The hardcoat layer was 2.4 μm in thickness after a cure.

[Evaluation of Disk Samples]

The following performance tests were conducted for individual disk samples prepared in the Embodiments 1 through 4, and Comparative Examples 1 and 2.

(Evaluation of Antifouling Property and Durability)

The contact angle was measured for the hardcoat surface of individual disk samples. Pure water was used as a measurement solution and a contact angle meter (Face Contact-Angle Meter, Kyowa Interface Science Co., Ltd.) was used to measure the static contact angle. The measurement was made at 20° C. and relative humidity of 60%. First, an initial contact angle (a) was measured.

Then, measurement was made for the contact angle (b) after wiping off with a solvent-permeated waste cloth for evaluating the antifouling property. More particularly, ethanol was permeated into non-woven cloth (Asahi Kasei Corporation, Bemcot Lint-Free CT-8), to which the hardcoat surface of individual disk samples was pressed under a load of 4.9 N/cm$^2$ and allowed to slide 50 times in a reciprocating fashion to measure the contact angle under similar conditions as described above.

(Haze after Abrasion)

The light transmitting layer and the hardcoat layer were, respectively, formed directly on the same supporting substrate that was used in Embodiment 1 under conditions identical to those for preparing individual light transmitting layers and hardcoat layers in Embodiments 1 through 4 as well as in Comparative examples 1 and 2. The thus obtained hardcoat layer surface of the hardcoat layered transparent base plate was subjected to 100 times abrasion at a load of 4.9N by using a Taper abrasion tester according to JIS K7204:1994. An abrasive wheel of CS-10F was used. Haze of the hardcoat layer surface after abrasion was measured by a haze meter TC-HIII DPK (Tokyo Denshoku Technical Center Co., Ltd.).

TABLE 1

Table 1 shows the above measurement results.

| Disk | Fluorinated urethane acrylate (A) | Curable compound (B) | Inorganic microparticles (C) | Contact angle (degree) | | Haze after abrasion |
|---|---|---|---|---|---|---|
| | | | | Initial (a) | After wiping off with a solvent-permeated waste cloth (b) | |
| Embodiment 1 | 1 | 6-functional group + 2 functional group | Silica | 107.5 | 107.3 | 2.5 |
| Embodiment 2 | 2 | 6-functional group + 2 functional group | Silica | 107.0 | 106.8 | 2.5 |
| Embodiment 3 | 2 | 6-functional group + 2 functional group | — | 107.0 | 106.5 | 3.3 |
| Embodiment 4 | 2 | 2-functional group | Silica | 106.5 | 106.3 | 9.2 |
| Comparative Example 1 | Perfluoropolyether diol | 6-functional group + 2 functional group | Silica | 104.0 | 74.5 | 2.4 |

TABLE 1-continued

Table 1 shows the above measurement results.

| Disk | Fluorinated urethane acrylate (A) | Curable compound (B) | Inorganic microparticles (C) | Contact angle (degree) Initial (a) | Contact angle (degree) After wiping off with a solvent-permeated waste cloth (b) | Haze after abrasion |
|---|---|---|---|---|---|---|
| Comparative Example 2 | Perfluoropolyether diol | 2-functional group | Silica | 102.5 | 71.3 | 9.0 |

Table 1 revealed that all the disk samples prepared in Embodiments 1 through 4, were excellent in antifouling property and durability, with hardness maintained on the hardcoat surface.

The above embodiments have shown that the hardcoat layer was imparted to the phase-change type optical disk. However, in the present invention, the recording layer is applicable not only to the phase-change type optical disks but also to playback-only optical disks and recordable optical disks. Further, in this invention, the recording layer is applicable not only to the optical disk but also to any impartation of the hardcoat layer to the surface of various objects. Thus, the previously-described embodiments are just examples and shall not be construed to give any restriction to the invention. In addition, any change in an equivalent range of what is claimed shall all be within the scope of the present invention.

INDUSTRIAL APPLICABILITY

According to the invention, a hardcoat agent composition effective in forming a hardcoat layer excellent in antifouling property and lubricating property as well as in scratch resistance and wear resistance is provided on the surface of various substances. In addition, a substance having on the surface the hardcoat layer formed by using the above-mentioned hardcoat agent composition is provided according to the invention. In particular, an optical information medium excellent in antifouling property and lubricating property as well as in scratch resistance and wear resistance on the surface of a record and/or playback beam entering side is provided according to the invention.

The invention claimed is:

1. A hardcoat agent composition which comprises:
    a fluorine-containing polyether compound (A) having a perfluoropolyether unit, an urethane bond and at least two active energy ray reactive groups at each of both ends of the molecular chain including said perfluoropolyether unit;
    and a curable compound (B) having equal to or more than two active energy ray polymerizing groups in the molecule; and
    inorganic microparticles (C) with a mean particle diameter of 100 nm or less,
    wherein the fluorine-containing polyether compound (A) is contained in a range from 0.01 parts by weight or greater to 3 parts by weight or less in relation to 100 parts by weight of a nonvolatile part in the said composition, and
    wherein the curable compound (B) contains 65 to 100% by weight of a curable compound (Bt) having three or more active energy ray polymerizing groups in the molecule and 0 to 35% by weight of a curable compound (Bd) having two active energy ray polymerizing groups in the molecule on the basis of the curable compound (B), and
    wherein the curable compound (B) contains no fluorine atoms.

2. The hardcoat agent composition according to claim 1, wherein the fluorine-containing polyether compound (A) has the number average molecular weight ranging from 500 or greater to 10,000 or less on the basis of polystyrene standard determined by GPC (Gel Permeation Chromatography).

3. The hardcoat agent composition according to claim 1, wherein the active energy ray reactive groups contained in the fluorine-containing polyether compound (A) are selected from the group consisting of an (meth)acryloyl group and vinyl group.

4. The hardcoat agent composition according to claim 1, wherein the fluorine-containing polyether compound (A) is a compound in which (meth)acryloyl groups are introduced via urethane bond into a hydroxyl group of a fluorine-containing polyether compound having said hydroxyl group at each of the both ends of a perfluoropolyether unit.

5. The hardcoat agent composition according to claim 1, wherein the inorganic microparticles (C) ranging from 5 parts by weight or greater to 500 parts by weight or less are contained in relation to 100 parts by weight of the curable compound (B).

6. The hardcoat agent composition according to claim 1, wherein the inorganic microparticles (C) are microparticles of metal or semi-metal oxide or microparticles of metal or semi-metal sulfide.

7. The hardcoat agent composition according to claim 1, wherein the inorganic microparticles (C) are silica microparticles.

8. The hardcoat agent composition according to claim 1, wherein the inorganic microparticles (C) are surface-modified by a hydrolyzable silane compound having an active energy ray reactive group.

* * * * *